(12) United States Patent
Goddard

(10) Patent No.: US 7,468,085 B2
(45) Date of Patent: Dec. 23, 2008

(54) SYSTEM AND METHOD FOR CLEANING A FILTER

(75) Inventor: John D. Goddard, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 414 days.

(21) Appl. No.: 11/305,188

(22) Filed: Dec. 19, 2005

(65) Prior Publication Data

US 2007/0137150 A1  Jun. 21, 2007

(51) Int. Cl.
*F01N 3/00* (2006.01)
(52) U.S. Cl. .......................... 55/385.3; 55/292; 55/293; 55/DIG. 30; 123/198 E; 60/297; 60/274; 60/275; 60/295; 60/311; 422/186.1; 422/186.16
(58) Field of Classification Search ............... 55/385.3, 55/DIG. 30, 292, 293; 123/198 E; 60/297, 60/274, 275, 295, 311; 422/186.1, 186.16
See application file for complete search history.

(56) References Cited

U.S. PATENT DOCUMENTS

| | | | |
|---|---|---|---|
| 3,983,036 A | 9/1976 | Lauzeral et al. | |
| 4,582,077 A | 4/1986 | Gabriel et al. | |
| 4,615,173 A * | 10/1986 | Usui et al. | 60/286 |
| 4,866,932 A | 9/1989 | Morita et al. | |
| 5,039,347 A | 8/1991 | Hindström et al. | |
| 5,062,965 A | 11/1991 | Bernou et al. | |
| 5,151,186 A | 9/1992 | Yoo et al. | |
| 5,212,948 A | 5/1993 | Gillingham et al. | |
| 5,305,602 A * | 4/1994 | Kojima et al. | 60/286 |
| 5,444,892 A | 8/1995 | Ris et al. | |
| 5,489,319 A * | 2/1996 | Tokuda et al. | 96/400 |
| 5,860,187 A | 1/1999 | Flaszynski et al. | |
| 5,900,043 A | 5/1999 | Grandjean et al. | |
| 6,241,878 B1 | 6/2001 | Snaper | |
| 6,251,294 B1 | 6/2001 | Davis et al. | |
| 6,526,753 B1 | 3/2003 | Bailey | |
| 6,641,646 B2 | 11/2003 | Rosenberg | |
| 6,793,716 B2 | 9/2004 | Rigaudeau et al. | |
| 6,893,487 B2 | 5/2005 | Alger et al. | |
| 6,908,498 B2 * | 6/2005 | Ament et al. | 95/278 |
| 6,962,046 B2 * | 11/2005 | Kuboshima et al. | 60/295 |
| 6,964,694 B2 * | 11/2005 | Rauchfuss et al. | 95/1 |
| 7,174,707 B2 * | 2/2007 | Megas et al. | 60/297 |
| 2004/0016699 A1 | 1/2004 | Bayevsky | |
| 2005/0011357 A1 | 1/2005 | Crawley | |
| 2005/0077227 A1 | 4/2005 | Kirker et al. | |
| 2005/0139705 A1 | 6/2005 | McGovern et al. | |
| 2005/0178111 A1 | 8/2005 | Kammel | |
| 2005/0191218 A1 | 9/2005 | Alward et al. | |

FOREIGN PATENT DOCUMENTS

GB  2371246 A  7/2002

* cited by examiner

*Primary Examiner*—Duane Smith
*Assistant Examiner*—Minh-Chau T Pham
(74) *Attorney, Agent, or Firm*—Finnegan, Henderson, Farabow, Garrett & Dunner

(57) ABSTRACT

A system for removing particulates from a filtering device of a machine. The system may include a flow assembly configured to direct a flow of gas through the filtering device, with one or more elements of the flow assembly being removably attached to a first opening of the filtering device. The system may also include a sound generation assembly configured to direct sound waves toward the filtering device to remove particulates from the filtering device.

19 Claims, 3 Drawing Sheets

SYSTEM AND METHOD FOR CLEANING A FILTER

TECHNICAL FIELD

The present disclosure relates generally to a filter cleaning device, and more particularly to a system and method for cleaning a diesel particulate filter with sound waves.

BACKGROUND

Engines, including diesel engines, gasoline engines, natural gas engines, and other engines known in the art, may exhaust a complex mixture of pollutants. The pollutants may be composed of gaseous and solid material, including particulate matter, nitrogen oxides ("NOx"), and sulfur compounds.

Due to heightened environmental concerns, engine exhaust emission standards have become increasingly stringent over time. The amount of pollutants emitted from an engine may be regulated depending on the type, size, and/or class of engine. One method that has been implemented by engine manufacturers to comply with the regulation of particulate matter, NOx, and sulfur compounds exhausted to the environment has been to remove these pollutants from the exhaust flow of an engine with a filter. The filter may trap these pollutants, and those trapped pollutants may build up in or on the components of the filter. The filter may be regenerated to burn off the built-up pollutants, such as, for example, soot or unburned hydrocarbons. However, regeneration may fail to burn off ash and/or other particulate matter, which may clog the filter, thereby causing filter functionality and engine performance to decrease. Moreover, regenerating the filter through conventional methods may take up to eight hours or longer, depending on, for example, the size of the filter, the configuration and material composition of the filter element, and the type of heat source used. Such a long regeneration period may be undesirable in some work machine environments. In addition, the temperatures required for regeneration may be in excess of 500 degrees Celsius (932 degrees Fahrenheit). At such temperatures, soot contained within the filter may spontaneously combust, resulting in damage to the filter and/or its components.

At least one system has been developed to clean particulates from a filter. For example, U.S. Pat. No. 5,900,043 to Grandjean et al. ("Grandjean") discloses an electrostatic filter with a process for cleaning the filter by vibrating a gas in a filter enclosure, such that the confinement provided by the filter enclosure is not broken during cleaning. The system in Grandjean includes a filter having a membrane on its top, behind which there is an acoustic wave generator. Starting the acoustic wave generator will fill the contents of a horn with vibrations, and will vibrate the air located under the membrane. The vibrations of the air adjacent to the filter elements detach dust accumulated on the filter elements so that the dust falls into a bin. However, the system in Grandjean may have disadvantages associated with it. For example, the addition of the acoustic wave generator to the filter increases the size and/or weight of the filter. Furthermore, the system in Grandjean may also require the use of bypass valves and/or multiple filters to ensure proper function, which may increase costs and complexity of the system.

The present disclosure is directed to overcoming one or more of the problems set forth above.

SUMMARY OF THE INVENTION

A system is provided for removing particulates from a filtering device of a machine. The system may include a flow assembly configured to direct a flow of gas through the filtering device, with one or more elements of the flow assembly being removably attached to a first opening of the filtering device. The system may also include a sound generation assembly configured to direct sound waves toward the filtering device to remove particulates from the filtering device.

A method of removing particulates from a filtering device of a machine is provided. The method may include removably attaching a service system to a first opening of the filtering device, directing a flow of gas through the filtering device, and directing sound waves into the filtering device to remove particulates from the filtering device.

A system is provided for removing particulates from a filtering device of a machine. The system may include a cleaning device removably attachable to the filtering device without removing the filtering device from the work machine to which the filtering device is connected. The cleaning device may be configured to remove the particulates by directing a substantially steady flow of gas and sound waves into the filtering device.

DETAILED DESCRIPTION

Reference will now be made in detail to the drawings. Wherever possible, the same reference numbers will be used throughout the drawings to refer to the same or like parts.

Figure 1:
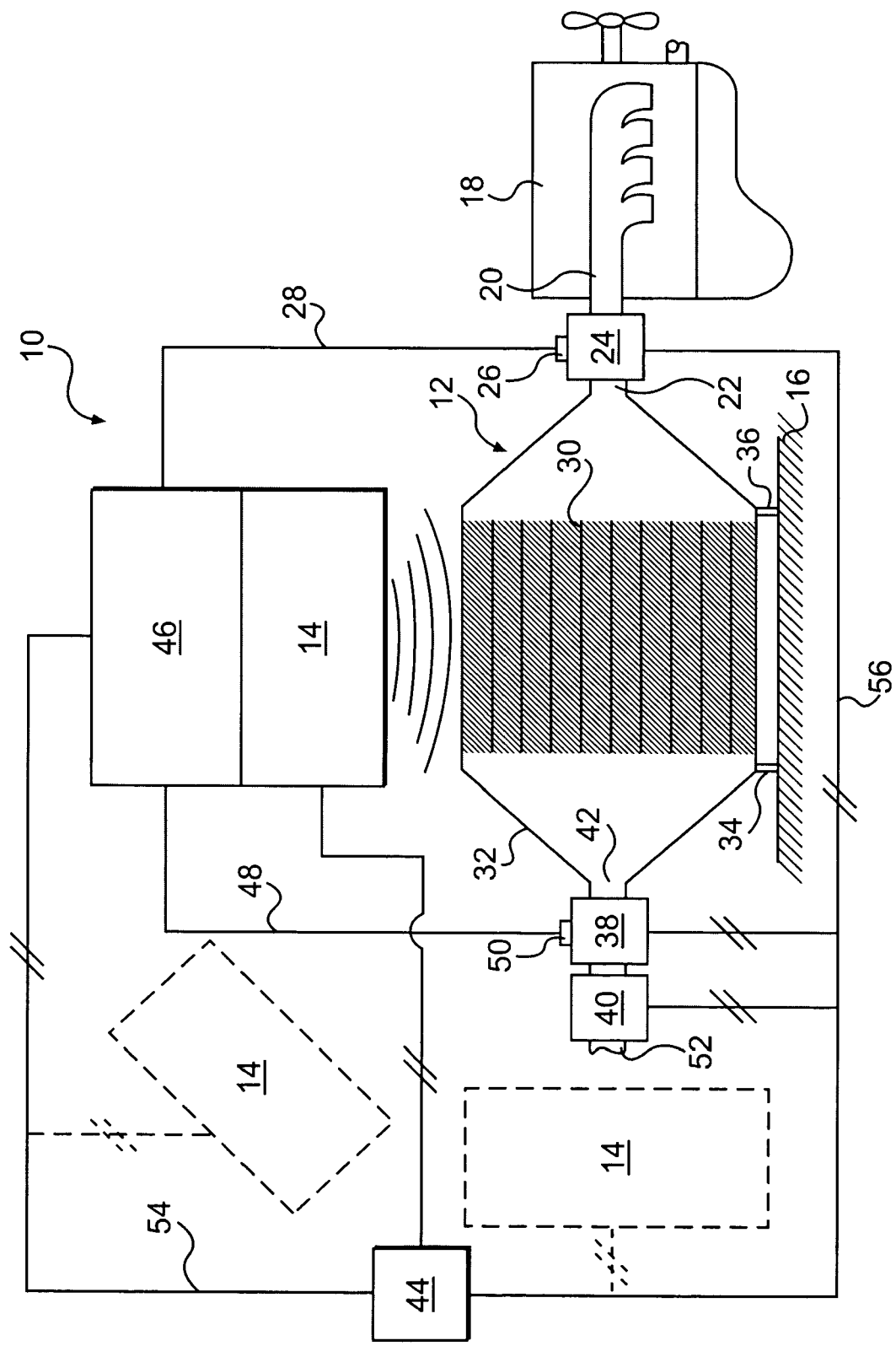
FIG. 1 provides a diagrammatic view of a service system according to an exemplary disclosed embodiment.

FIG. 1 illustrates an exemplary embodiment of a service system 10 attached to a filtering device 12. Service system 10 may include a sound generation assembly 14 and a flow assembly 46. Service system 10 may be operatively attached to filtering device 12 during servicing, and may be removed from filtering device 12 when service is complete. As such, a user may operatively attach and remove service system 10 without removing filtering device 12 from a work machine 16, vehicle, or other device to which filtering device 12 may be attached. Additionally or alternatively, a user may operatively attach and remove the service system 10 to filtering device 12 upon removing filtering device 12 from work machine 16. It is also contemplated that service system 10 may be permanently connected to filtering device 12, and may perform its various functions during servicing and/or during operation of work machine 16. As used herein, the term "work machine" may include on-road vehicles, off-road vehicles, and stationary machines, such as, for example, generators and/or other exhaust-producing devices.

In one embodiment of the present disclosure, filtering device 12 may be connected to an internal combustion engine 18, such as, for example, a diesel engine. Internal combustion engine 18 may include an exhaust line 20 connecting an exhaust flow of internal combustion engine 18 with an inlet 22 of filtering device 12. Internal combustion engine 18 may also include a turbocharger (not shown) connected to exhaust line 20. In such an embodiment, inlet 22 of filtering device 12 may be connected to an outlet of the turbocharger.

An inlet valve device 24 may be disposed between exhaust line 20 and inlet 22 of filtering device 12. In one embodiment, inlet valve device 24 may be include at least two positions. In one position, inlet valve device 24 may be configured to allow the exhaust flow of internal combustion engine 18 to enter filtering device 12. In another position, inlet valve device 24 may prevent fluid communication between internal combustion engine 18 and filtering device 12, while placing filtering device 12 and service system 10 into fluid communication. Such a configuration may be advantageous during, for example, servicing of filtering device 12. It is contemplated that service system 10 may be removably attached to inlet valve device 24 by a fluid coupling device 26, configured to selectively fluidly couple a flow conduit 28 of service system 10 to exhaust line 20. It is also contemplated that inlet valve device 24 may be controlled and/or actuated by any means known in the art, such as, for example, by a solenoid, pneumatics, and/or manual control. Additionally or alternatively, flow conduit 28 may be coupled directly to exhaust line 20 and/or inlet 22 using fluid coupling device 26. Fluid coupling device 26 may include, for example, any suitable quick disconnect fitting, or similar device, known in the art.

Filtering device 12 may include any type of filter known in the art, such as, for example, a foam cordierite, sintered metal or silicon carbide type filter. Filtering device 12 may include filter element 30. Filter element 30 may include any material useful in removing pollutants and/or particulates from an exhaust flow. In some embodiments of the present disclosure, filter element 30 may contain catalyst materials capable of collecting, for example, soot, NOx, sulfur compounds, particulate matter, and/or other pollutants known in the art. Such catalyst materials may include, for example, alumina, platinum, rhodium, barium, cerium, and/or alkali metals, alkaline-earth metals, rare-earth metals or combinations thereof. Filter element 30 may be situated horizontally (as shown in FIG. 1), vertically, radially, or helically. Additionally or alternatively, filter element 30 may be situated in a honeycomb, mesh, or any other configuration so as to maximize the surface area available for the filtering of pollutants in the exhaust flow.

Filtering device 12 may include a filter housing 32 and may be secured to work machine 16 by filter brackets 34, 36 that may be attached to both work machine 16 and filter housing 32. Filter brackets 34, 36 may be made of metal, plastic, rubber, or any other material known in the art to facilitate connecting a filter to a device. In addition to securing filtering device 12 to work machine 16, filter brackets 34, 36 may also be configured to dampen filtering device 12 from vibration, jarring, or sudden movements of work machine 16, to which filtering device 12 may be attached.

Filtering device 12 may further include an outlet valve device 38 disposed proximate an outlet 42 of filtering device 12. In a first state of operation, outlet valve device 38 may direct the exhaust flow from filtering device 12 towards a diagnostic device 40. In a second state of operation, outlet valve device 38 may place service system 10 into fluid communication with filtering device 12 while taking filtering device 12 out of fluid communication with diagnostic device 40. A flow conduit 48 of service system 10, similar to flow conduit 28 described above, may be removably attached to a filtered exhaust line 52, outlet valve device 38, and/or outlet 42, with a fluid coupling device 50, such as, for example, any suitable quick disconnect fitting or similar device, as is known in the art.

Inlet and outlet valve devices 24, 38 may include either the same or different types of valve devices, depending on the requirements of the application. Examples of suitable valve devices may include three-way valves, poppet valves, butterfly valves, ball valves, and/or any other type of controllable flow valve devices known in the art. Inlet and outlet valve devices 24, 38 may be actuated using solenoids, pneumatics, and/or manual actuation. In operation, inlet and outlet valve devices 24, 38 may be controlled to allow any range of exhaust flow to pass from internal combustion engine 18 into and out of filtering device 12, wherein the range may cover total restriction of exhaust flow, unrestricted exhaust flow, and all points in between.

Diagnostic device 40 may be disposed proximate outlet 42 of filtering device 12, and may be part of work machine 16 and/or external to filtering device 12. Additionally or alternatively, diagnostic device 40 may be internal to filtering device 12. Diagnostic device 40 may include one or more sensing devices known in the art, such as, for example, flow meters, emission meters, pressure transducers, or other sensors. Accordingly, diagnostic device 40 may sense, for example, an increase in the levels of soot, NOx, particulates, or other pollutants leaving filtering device 12. Diagnostic device 40 may send pollutant level information to a controller 44 that may assist in triggering filter regeneration and/or filter servicing. It should be understood that, as used herein, the term "regeneration" may mean oxidization of carbonaceous soot and hydrocarbons.

Sound generation assembly 14 may include one or more vibrating objects capable of setting particles in a medium, such as air, into vibratory motion. The motion of the particles may create compressions (high pressure regions) and rarefactions (low pressure regions) in the medium. Ash trapped in or on filter element 30 may be subject to the compressions and rarefactions, and thus, may also vibrate. This vibration may free the ash from filter element 30. Additionally or alternatively, the vibration produced by sound generation assembly 14 may be adjusted to fit the natural frequency of the ash in filter element 30. Accordingly, the vibration produced by sound generation assembly 14 may force the ash in filter element 30 into resonance. The vibratory motion of the resonating ash may assist in the removal of the ash from filter element 30. Thus, tuned frequencies may be provided directly to filter device 12 and filter element 30, in order to allow service system 10 to achieve maximum soot removal, with minimal damage to filter device 12 and/or filter element 30.

Figure 2:
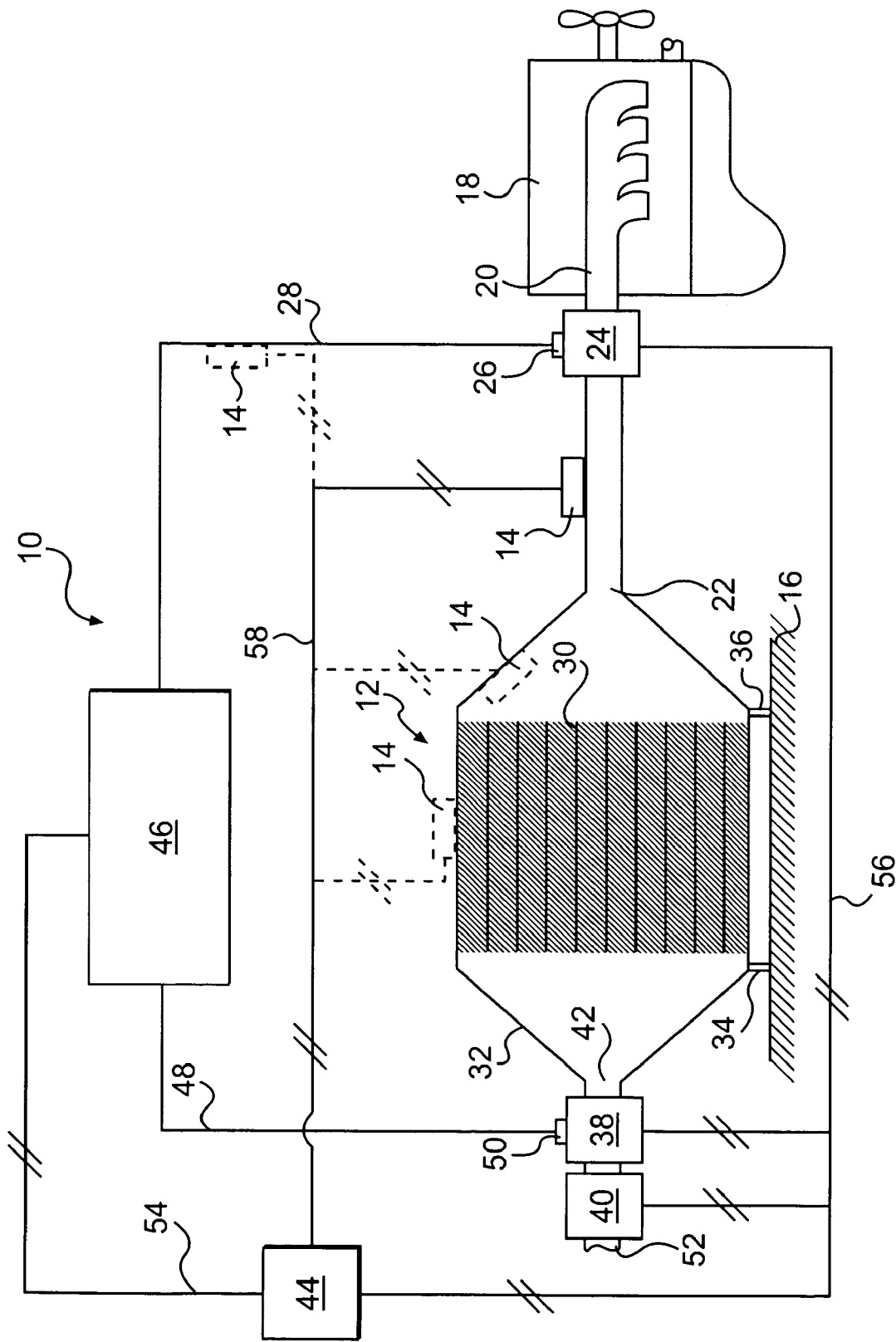
FIG. 2 provides a diagrammatic view of a service system according to another exemplary disclosed embodiment.

Additionally or alternatively still, the vibratory motion from sound generation assembly 14 may be directly transmitted to filtering device 12 and/or filter element 30 to shake the ash from filter element 30, as shown in FIG. 2. For example, sound generation assembly 14 may include a transducer (converter), a booster, and/or a horn. The transducer may convert electrical energy into mechanical vibrations using, for example, piezoelectric actuators or the like, and the booster may amplify those mechanical vibrations. The amplified mechanical vibrations from the booster may be transmitted to the horn, which may transmit the amplified mechanical vibrations to filtering device 12, filter element 30, conduit 28, filter housing 32, and/or exhaust line 20, through either direct or indirect contact with those elements. It is also contemplated that filtering device 12, filter element 30, conduit 28, filter housing 32, and/or exhaust line 20 may be in contact with the booster, such that one or more of those elements may act as the horn. It should be understood that sound generation assembly 14 may utilize infrasonic sound, ultrasonic sound, and/or sound having a frequency ranging anywhere between infrasonic and ultrasonic, in order to clean filter element 30. In its various embodiments, sound generation assembly 14 may include, for example, one or more loudspeakers, horns, and/or other suitable devices.

Figure 3:
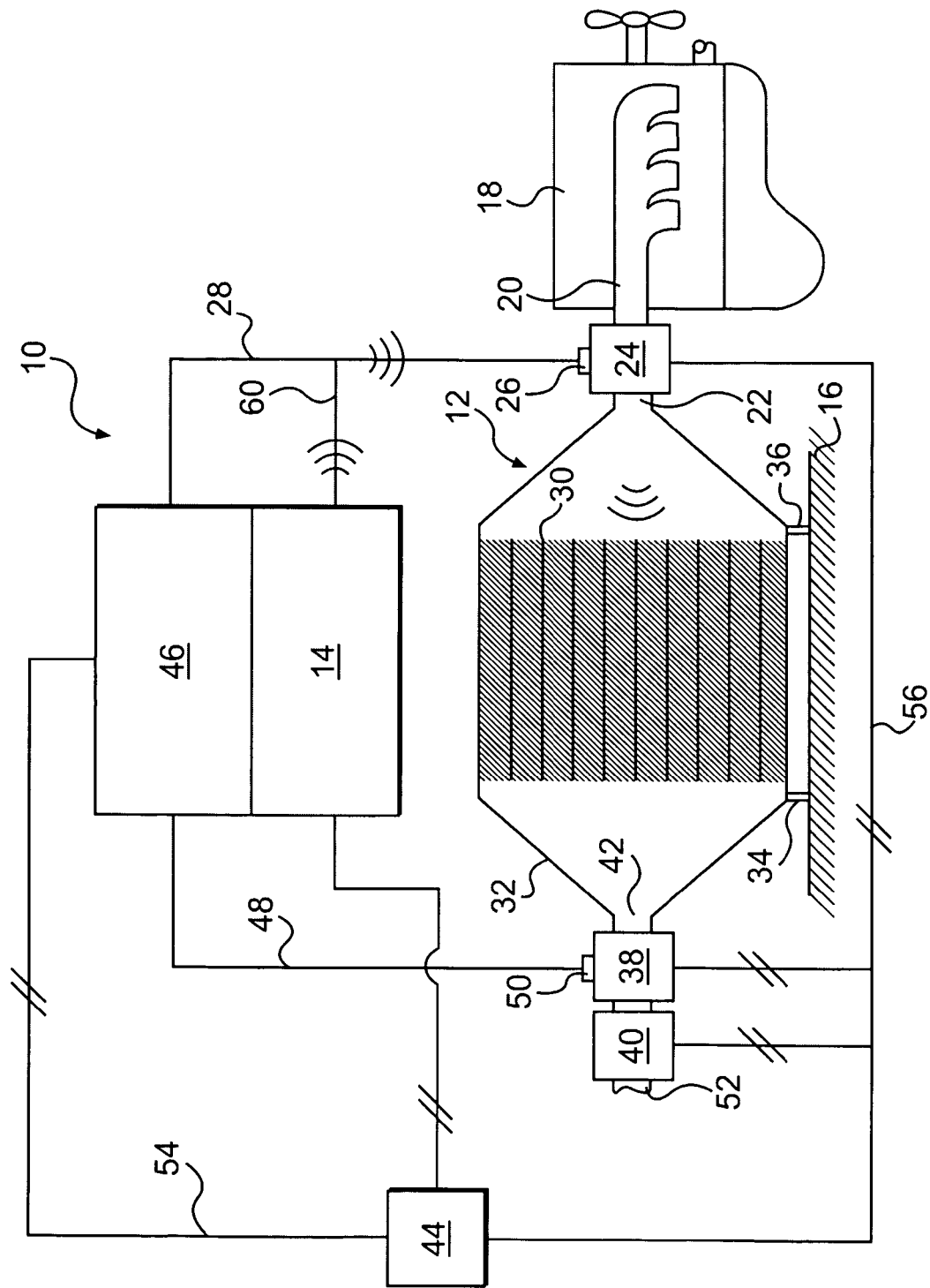
FIG. 3 provides a diagrammatic view of a service system according to another exemplary disclosed embodiment.

In yet another embodiment, shown in FIG. 3, sound generation assembly 14 may direct sound waves through a tube 60, into flow conduit 28, out through inlet 22, and into filtering device 12. It is also contemplated that the sound waves may travel from sound generation assembly 14 into filtering device 12 from the opposite direction, if tube 60 is connected to flow conduit 48. The sound waves may help to remove the particulates from filtering device 12 by, for example, shaking, loosening, or scrubbing the particulates using energy provided by the fluctuations of the sound waves. The removed particulates may then be vacuumed or carried away by an air mass flow from any suitable flow assembly or vacuum device. One embodiment of such a device will be further described below. It should be understood that any combination of the cleaning mechanisms described above may be utilized to assist cleaning of filter element 30.

Sound generation assembly 14 of FIG. 1 may be located on or near filtering device 12 at a location where the sound waves may assist in removing matter from filter element 30, as described above. In an exemplary embodiment, sound generation assembly 14 may be disposed alongside filter housing 32 so as to extend along a length of filter element 30. In such an embodiment, the sound waves may propagate in a direction substantially perpendicular to the direction of travel of the flow of gas. In another embodiment, sound generation assembly 14 may be disposed on or near inlet 22 or outlet 42 of filtering device 12 so that the sound waves may propagate through filter element 30 in substantially the same or opposite direction as the direction of travel of the flow of gas through filter element 30. Additionally or alternatively, sound generation assembly 14 may be oriented relative to filtering device 12 so that the direction of propagation of the sound waves impinges filter element 30 at an angle. The distance between sound generation assembly 14 and filtering device 12 may be adjusted to increase or decrease the intensity of the sound waves. Additionally or alternatively still, sound generation assembly 14 may be either removably or permanently mounted directly onto filtering device 12, filter element 30, conduit 28, exhaust line 20, and/or housing 32, as shown in FIG. 2 It is also contemplated that multiple sound generation assemblies (shown in dashed lines in FIGS. 1 and 2), may be used, and each sound generation assembly may be oriented as described above.

Sound generation assembly 14 may be electrically connected to controller 44, or any other control device known in the art, configured to turn sound generation assembly 14 on and off, and control the frequency and/or intensity of the sound waves transmitted by sound generation assembly 14. Electrical connections 54, 56 can be seen in FIG. 1. Additionally or alternatively, sound generation assembly 14 may be operated by manual control.

Service system 10 may also include a flow assembly 46. Flow assembly 46 may be configured to supply and/or receive a flow of gas, such as air, into and out of filtering device 12 using one or more flow conduits 28, 48. Flow conduits 28, 48 may include, for example, tubing, piping, and/or hoses known in the art. Flow conduits 28, 48 may be plastic, rubber, aluminum, copper, steel, or any other material capable of delivering a compressed gas in a controlled manner, and may be flexible or rigid. The lengths of flow conduits 28, 48 may be minimized to facilitate operation of service system 10, while reducing the pressure drop between flow assembly 46 and filtering device 12.

The flow of gas to and/or from flow assembly 46 may be characterized by a steady flow rate, as opposed to a pulse, burst, or shockwave of gas that may damage filtering device 12 and/or filter element 30. During servicing of filtering device 12, when inlet and outlet valve devices 24, 38 may place filtering device 12 into fluid communication with flow assembly 46 of service system 10, flow assembly 46 may circulate the flow of gas into inlet 22 of filtering device 12, while receiving the flow of gas from outlet 42 of filtering device 12 once the flow of gas has traveled through filter element 30. Additionally or alternatively, flow assembly 46 may direct the flow of gas in the opposite direction. Flow assembly 46 may also include a filtration device and/or receptacle (not shown) for trapping and/or storing particulates, such as ash, that may be found in the flow of gas.

Service system 10 may be activated by controller 44, which may be triggered by, for example, diagnostic device 40. Additionally or alternatively, service system 10 may be manually activated by a work machine operator or technician servicing filtering device 12. Controller 44 may also move inlet and outlet valve devices 24, 38 into their opened positions, closed positions, and positions therebetween, to ready filtering device 12 for cleaning. Next, service system 10 may direct the flow of gas through filtering device 12 and filter element 30 using flow assembly 46. Sound generation assembly 14 may provide sound waves before, after, or concurrently with the flow of gas, to loosen ash and/or other particulates from filter element 30, which in turn may be carried away by the flow of gas. Additionally, the direction of the flow of gas may be reversed one or more times so that the flow of gas may be directed through filter element 30 in both directions. This cleaning process may continue until filtering device 12 is sufficiently unclogged.

INDUSTRIAL APPLICABILITY

The disclosed service system 10, shown in FIG. 1, may be used with filtering device 12, and/or any other suitable filtering device or matter collection device known in the art. Such devices may be useful in any applications where the removal of matter may be desired. For example, service system 10 may be used on diesel, gasoline, natural gas, and/or other combustion engines or furnaces known in the art. Thus, as discussed above, the disclosed service system 10 may be used in conjunction with any work machine 16, on-road vehicle, off-road vehicle, stationary machine, and/or other exhaust-producing machine to remove matter from a filtering device mounted thereon.

A variety of different methods and systems may be used to remove matter from filtering device 12. One known method may include regeneration. During regeneration, a heater or some other heat source (not shown) may be used to increase the temperature of filtering device 12. The heater may also increase the temperature of trapped particulate matter above its combustion temperature, thereby burning away the collected particulate matter and regenerating filtering device 12 while leaving behind a small amount of ash. Although regeneration may reduce the buildup of particulate matter in filtering device 12, repeated regeneration of filtering device 12 may result in a buildup of ash in filtering device 12 over time, thus resulting in a deterioration in filter performance. In addition to the ash, soot and/or other particulates may also accumulate in filtering device 12. Service system 10 may be used to clean ash, soot, and/or other particulates, from filtering device 12, whether filtering device 12 is mounted on or removed from work machine 16.

To begin the removal of matter from filtering device 12, internal combustion engine 18 may be turned off such that combustion ceases and there is no exhaust flow from internal combustion engine 18 to its exhaust line 20. Inlet and outlet valve devices 24, 38 may be actuated by a controller 44, machine operator, or technician, to place filtering device 12 into fluid communication with a flow assembly 46 of service system 10. Additionally or alternatively, in an embodiment where inlet and outlet valve devices 24, 38 can be actuated by a solenoid or other means, inlet and outlet valve devices 24, 38 may be adjusted by remote actuation.

Flow assembly 46 may be activated and may begin to supply the flow of gas into filtering device 12. The flow of gas may enter into an inlet 22 of filtering device 12 and exit through an outlet 42 of filtering device 12, or vice-versa. In traveling between inlet 22 and outlet 42, the flow of gas may pass through filter element 30. A sound generation assembly 14 may be located on or near filtering device 12, and may be activated before, after, and/or during activation of flow assembly 46, in order to direct sound waves into filtering device 12. By using the sound waves to create vibratory motion in, on, around, and/or within filtering device 12, filter element 30, and/or the particulate matter trapped therein, sound generation assembly may assist in dislodging the trapped particulate matter.

Controller 44, the work machine operator, and/or the technician, may determine whether filtering device 12 is substantially free of ash using diagnostic device 40. For example, after running service system 10 for a period of time, it may be disconnected, and inlet and outlet valve devices 24, 38 may be adjusted to provide fluid communication between filtering device 12, internal combustion engine 18, and diagnostic device 40. Internal combustion engine 18 may be started, and diagnostic device 40 may determine whether filtering device 12 is operating under substantially ash-free conditions or whether filtering device 12 may require further service. If further service is required, the cleaning process may be repeated until filter performance returns to satisfactory levels.

Thus, according to this disclosure, service system 10 may clean particulates, such as ash and/or soot, from filter element 30, thus providing better performance from internal combustion engine 18. Also, the cleaning of filter element 30 may extend the useful life of filtering device 12 and in doing so, may cut down on filter replacement costs. Furthermore, through the use of sound generation assembly 14 as a cleaning mechanism, filter cleaning may be achieved without subjecting filter element 30 to air bursts, air pulses, and/or scrubbers that could permanently damage filter element 30. Additionally, service system 10 may be connected and/or mounted onto filtering device 12 without removing filtering device 12 from work machine 16, thus eliminating the time, effort, and inconvenience associated with detaching filtering device 12 from work machine 16, transporting or otherwise moving filtering device 12 for cleaning, and re-attaching filtering device 12 to work machine 16 when cleaning has been completed.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A system for removing particulates from a filtering device of a machine, comprising:
    an engine in flow communication with the filtering device;
    a first valve located between the engine and the filtering device, the first valve configured to permit a flow of exhaust from the engine into the filtering device when the first valve is in a first position and the first valve configured to block the flow of exhaust into the filtering device when the first valve is in a second position;
    a flow assembly configured to direct a flow of gas through the filtering device when the first valve is in the second position, one or more elements of the flow assembly being removably attached to a first opening of the filtering device; and
    a sound generation assembly configured to direct sound waves toward the filtering device to remove particulates from the filtering device.

2. The system of claim 1, wherein the flow of gas is a substantially steady flow of gas.

3. The system of claim 1, wherein the flow assembly is configured to selectively direct the flow of gas in a first direction via the first valve, and a second direction opposite the first direction via a second valve.

4. The system of claim 1, wherein the sound generation assembly extends along at least a portion of the filtering device.

5. The system of claim 4, wherein the sound generation assembly extends along at least a portion of the filter element.

6. The system of claim 1, wherein the sound generation assembly includes a plurality of sound generators.

7. The system of claim 1, wherein the sound waves remove the particulates using vibration.

8. The system of claim 7, wherein the particulates are carried away from the filtering device by the flow of gas.

9. A method of removing particulates from a filtering device of a machine, comprising:
    removably attaching a service system to a first opening of the filtering device;
    blocking a flow of exhaust gas from the engine into the filtering device;
    directing a flow of gas through the filtering device from the service system; and
    directing sound waves into the filtering device to remove particulates from the filtering device; and
    carrying the particulates out of the filtering device with the flow of gas.

10. The method of claim 9, wherein the sound waves remove the particulates by vibration.

11. The method of claim 10, wherein the sound waves cause the particulates to vibrate.

12. The method of claim 10, wherein the sound waves cause at least a portion of the filtering device to vibrate.

13. The method of claim 9, further including switching the direction of the flow of gas through the filtering device.

14. The method of claim 9, further including directing sound waves into the filtering device from a plurality of directions.

15. The method of claim 9, wherein the flow of gas has a substantially steady flow rate.

16. The method of claim 9, further including removably attaching the service system to the filtering device without removing the filtering device from the machine to which the filtering device is connected.

17. A system for removing particulates from a filtering device of a machine, comprising:
    an engine in flow communication with the filtering device;
    a valve located between the engine and the filtering device, the valve configured to permit a flow of exhaust from the engine into the filtering device when the valve is in a first position and the valve configured to block the flow of exhaust into the filtering device when the valve is in a second position;

a cleaning device removably attachable to the filtering device without removing the filtering device from the machine to which the filtering device is connected;

wherein the cleaning device is configured to remove the particulates by directing a substantially steady flow of gas and sound waves into the filtering device when the valve is in the second position.

18. The system of claim 17, wherein the cleaning device further includes a flow assembly configured to supply the steady flow of gas.

19. The system of claim 17, wherein the cleaning device further includes a sound generation assembly configured to generate the sound waves

* * * * *